United States Patent
Weller et al.

(10) Patent No.: US 9,922,282 B2
(45) Date of Patent: Mar. 20, 2018

(54) AUTOMATED READINESS EVALUATION SYSTEM (ARES) FOR USE WITH AN UNMANNED AIRCRAFT SYSTEM (UAS)

(71) Applicant: LIMITLESS COMPUTING, INC., Superior, CO (US)

(72) Inventors: Errin T. Weller, Superior, CO (US); Jeffrey B. Franklin, Superior, CO (US)

(73) Assignee: LIMITLESS COMPUTING, INC., Boulder, CO (US)

( * ) Notice: Subject to any disclaimer, the term of this patent is extended or adjusted under 35 U.S.C. 154(b) by 78 days.

(21) Appl. No.: 15/195,735

(22) Filed: Jun. 28, 2016

(65) Prior Publication Data

US 2017/0021925 A1    Jan. 26, 2017

Related U.S. Application Data

(60) Provisional application No. 62/194,970, filed on Jul. 21, 2015.

(51) Int. Cl.
*G05D 1/02* (2006.01)
*G06K 19/07* (2006.01)
(Continued)

(52) U.S. Cl.
CPC ........ *G06K 19/0723* (2013.01); *B64C 39/024* (2013.01); *B64D 45/00* (2013.01);
(Continued)

(58) Field of Classification Search
CPC .. G05D 1/0027; G05D 1/0202; G05D 1/0016; G05D 2201/0207; G05B 19/00; B64C 39/02; B64C 2201/126; B64C 2201/146; B64C 2201/141; G06F 19/3456; G06F 2203/04104; G06F 3/00; G06F 3/04842; G08G 5/0069; G08G 5/0013
(Continued)

(56) References Cited

U.S. PATENT DOCUMENTS 5,571,953 A    11/1996   Wu
5,581,250 A    12/1996   Khvilivitzky
(Continued)

FOREIGN PATENT DOCUMENTS

CN    102114914 A    7/2011
CN    102566420 A    7/2012
(Continued)

*Primary Examiner* — Dalena Tran
(74) *Attorney, Agent, or Firm* — Marsh Fischmann & Breyfogle LLP; Kent A. Lembke

(57) ABSTRACT

Methods and systems for an Automated Readiness Evaluation System (ARES), which is adapted for use with unmanned aircraft systems (UAS). The ARES (and UAS with such an ARES) is configured for a particular task or application selected by the user based upon their level of specific knowledge. The system may include: hardware components with communication protocols; a task, module data, and skill level repository; a user device; and an optional base system. Methods are provided for configuration, calibration, error checking, and operation of a UAS whereby the ARES serves as a mission planner by calculating the mission parameters for a user-selected task to minimize mission failure by determining the variables for task completion.

20 Claims, 10 Drawing Sheets

(51) Int. Cl.

| | | |
|---|---|---|
| *B64C 39/02* | (2006.01) | |
| *B64D 47/08* | (2006.01) | |
| *G05D 1/00* | (2006.01) | |
| *B64D 45/00* | (2006.01) | |
| *G08G 5/00* | (2006.01) | |
| *B64F 5/10* | (2017.01) | |
| *B64F 5/60* | (2017.01) | |
| *G06F 3/00* | (2006.01) | |
| *G06F 11/00* | (2006.01) | |
| *G06Q 10/00* | (2012.01) | |
| *G06Q 50/30* | (2012.01) | |

(52) U.S. Cl.
CPC ............... *B64D 47/08* (2013.01); *B64F 5/10* (2017.01); *B64F 5/60* (2017.01); *G05D 1/0011* (2013.01); *G06F 3/00* (2013.01); *G06F 11/00* (2013.01); *G06Q 10/00* (2013.01); *G06Q 50/30* (2013.01); *G08G 5/0013* (2013.01); *G08G 5/0026* (2013.01); *G08G 5/0069* (2013.01); *B64C 2201/125* (2013.01); *B64C 2201/126* (2013.01); *B64C 2201/127* (2013.01); *B64C 2201/146* (2013.01)

(58) Field of Classification Search
USPC ............... 701/2–3, 472, 522, 526; 718/104
See application file for complete search history.

(56) References Cited

U.S. PATENT DOCUMENTS

| | | |
|---|---|---|
| 5,901,272 A | 5/1999 | Schaefer, Jr. et al. |
| 5,904,724 A | 5/1999 | Margolin |
| 6,023,061 A | 2/2000 | Bodkin |
| 6,085,127 A | 7/2000 | Vos |
| 6,114,970 A | 9/2000 | Kirson et al. |
| 6,122,572 A | 9/2000 | Yavnai |
| 6,140,958 A | 10/2000 | Johnson et al. |
| 6,208,936 B1 | 3/2001 | Minor et al. |
| 6,260,796 B1 | 7/2001 | Klingensmith |
| 6,460,810 B2 | 10/2002 | James |
| 6,473,824 B1 | 10/2002 | Kreissig et al. |
| 6,497,600 B1 | 12/2002 | Levy et al. |
| 6,539,290 B1 | 3/2003 | Vos |
| 6,577,976 B1 | 6/2003 | Hoff et al. |
| 6,584,382 B2 | 6/2003 | Karem |
| 6,665,594 B1 | 12/2003 | Armstrong |
| 6,694,228 B2 | 2/2004 | Rios |
| 6,710,567 B2 | 3/2004 | Heydt et al. |
| 6,711,477 B1 | 3/2004 | Johnson et al. |
| 6,801,769 B1 | 10/2004 | Royalty |
| 6,840,480 B2 | 1/2005 | Carroll |
| 6,847,856 B1 | 1/2005 | Bohannon |
| 6,847,865 B2 | 1/2005 | Carroll |
| 6,856,894 B1 | 2/2005 | Bodin et al. |
| 6,859,729 B2 | 2/2005 | Breakfield et al. |
| 6,873,886 B1 | 3/2005 | Mullen et al. |
| 6,925,382 B2 | 8/2005 | Lahn |
| 6,948,681 B2 | 9/2005 | Stupakis |
| 7,093,294 B2 | 8/2006 | Lingafelt et al. |
| 7,130,741 B2 | 10/2006 | Bodin et al. |
| 7,228,232 B2 | 6/2007 | Bodin et al. |
| 7,231,294 B2 | 6/2007 | Bodin et al. |
| 7,252,453 B1 | 8/2007 | Little |
| 7,262,730 B2 | 8/2007 | Larsson et al. |
| 7,269,513 B2 | 9/2007 | Herwitz |
| 7,315,548 B2 | 1/2008 | Joshi |
| 7,331,019 B2 | 2/2008 | Ananth et al. |
| 7,346,188 B2 | 3/2008 | Aichi |
| 7,370,078 B1 | 5/2008 | Woodruff |
| 7,431,243 B1 | 10/2008 | Allen |
| 7,474,212 B2 | 1/2009 | Nakagawa et al. |
| 7,477,993 B2 | 1/2009 | Sunshine et al. |
| 7,496,670 B1 | 2/2009 | Givoly |
| 7,502,684 B2 | 3/2009 | Haas |
| 7,581,702 B2 | 9/2009 | Olson et al. |
| 7,592,945 B2 | 9/2009 | Colburn et al. |
| 7,598,888 B2 | 10/2009 | Matuska et al. |
| 7,617,024 B2 | 11/2009 | Builta |
| 7,641,461 B2 | 1/2010 | Khoshnevis |
| 7,647,232 B2 | 1/2010 | Moitra et al. |
| 7,669,805 B2 | 3/2010 | Hors et al. |
| 7,680,691 B2 | 3/2010 | Kimball et al. |
| 7,737,878 B2 | 6/2010 | Van Tooren et al. |
| 7,765,038 B2 | 7/2010 | Appleby et al. |
| 7,806,371 B2 | 10/2010 | Troutman |
| 7,865,277 B1 | 1/2011 | Larson et al. |
| 7,931,238 B2 | 4/2011 | Builta et al. |
| 7,962,252 B2 | 6/2011 | Shams et al. |
| 7,962,254 B2 | 6/2011 | Bouchet et al. |
| 7,970,539 B2 | 6/2011 | Lee |
| 8,024,138 B2 | 9/2011 | Carroll et al. |
| 8,074,941 B2 | 12/2011 | Daunois et al. |
| 8,078,395 B2 | 12/2011 | Builta et al. |
| 8,106,746 B2 | 1/2012 | Maltseff et al. |
| 8,141,814 B2 | 3/2012 | Kulesha |
| 8,155,805 B2 | 4/2012 | Van Der Spek |
| 8,167,236 B2 | 5/2012 | Jess |
| 8,186,589 B2 | 5/2012 | Asher et al. |
| 8,355,834 B2 | 1/2013 | Duggan et al. |
| 8,457,809 B2 | 6/2013 | Lee |
| 8,473,125 B2 | 6/2013 | Rischmuller et al. |
| 8,474,761 B2 | 7/2013 | Callou |
| 8,498,447 B2 | 7/2013 | Derbanne |
| 8,515,609 B2 | 8/2013 | McAndrew et al. |
| 8,543,265 B2 | 9/2013 | Ekhaguere et al. |
| 8,600,602 B1 | 12/2013 | McAndrew et al. |
| 8,662,438 B2 | 3/2014 | Savoye et al. |
| 8,838,289 B2 | 9/2014 | Margolin |
| 8,989,924 B2 | 3/2015 | Parrot |
| 9,004,396 B1 | 4/2015 | Colin et al. |
| 9,004,973 B2 | 4/2015 | Condon et al. |
| 9,011,250 B2 | 4/2015 | Condon et al. |
| 9,044,543 B2 | 6/2015 | Levien et al. |
| 9,061,102 B2 | 6/2015 | Levien et al. |
| 9,146,557 B1 | 9/2015 | Ahmed et al. |
| 9,195,233 B2 | 11/2015 | Perrone |
| 2003/0009270 A1 | 1/2003 | Breed |
| 2005/0004723 A1 | 1/2005 | Duggan et al. |
| 2008/0294305 A1 | 11/2008 | Roesch |
| 2010/0004798 A1 | 1/2010 | Bodin et al. |
| 2010/0084513 A1 | 4/2010 | Gariepy et al. |
| 2010/0250022 A1 | 9/2010 | Hines et al. |
| 2011/0049290 A1 | 3/2011 | Seydoux et al. |
| 2011/0084162 A1 | 4/2011 | Goossen et al. |
| 2011/0221692 A1 | 9/2011 | Seydoux et al. |
| 2011/0320068 A1 | 12/2011 | Lee et al. |
| 2012/0215382 A1 | 8/2012 | Lee et al. |
| 2013/0325217 A1 | 12/2013 | Parrot |
| 2014/0061377 A1 | 3/2014 | Smith |
| 2014/0074339 A1* | 3/2014 | Casado ............... G05D 1/0088 701/24 |
| 2014/0178843 A1* | 6/2014 | Smyth ............... G09B 19/00 434/238 |
| 2014/0191079 A1 | 7/2014 | Ehinger et al. |
| 2014/0229004 A1 | 8/2014 | Dooley et al. |
| 2014/0365258 A1* | 12/2014 | Vestal ............ G06Q 10/06311 705/7.15 |
| 2015/0051755 A1 | 2/2015 | Erhart et al. |
| 2016/0093124 A1* | 3/2016 | Shi ............... G07C 5/0808 701/2 |

FOREIGN PATENT DOCUMENTS

| | | |
|---|---|---|
| CN | 103217983 A | 7/2013 |
| CN | 102114914 B | 3/2014 |
| CN | 102566420 B | 8/2014 |
| CN | 104097773 A | 10/2014 |
| CN | 102849226 B | 10/2015 |
| DE | 102008014853 A1 | 10/2009 |
| DE | 102008014853 B4 | 11/2010 |
| DE | 102006013402 B4 | 4/2011 |

(56) References Cited

FOREIGN PATENT DOCUMENTS

| | | |
|---|---|---|
| DE | 102013000409 A1 | 7/2014 |
| EP | 1898181 A1 | 3/2008 |
| EP | 1926007 A2 | 5/2008 |
| EP | 2177966 A2 | 4/2010 |
| EP | 2818835 A3 | 3/2015 |
| WO | 2012085305 A1 | 6/2012 |
| WO | 2014029431 A1 | 2/2014 |
| WO | 2015021159 A1 | 2/2015 |
| WO | 2015073687 A1 | 5/2015 |
| WO | 2015085155 A1 | 6/2015 |
| WO | 2015103700 A1 | 7/2015 |
| WO | 2015126447 A1 | 8/2015 |

\* cited by examiner

AUTOMATED READINESS EVALUATION SYSTEM (ARES) FOR USE WITH AN UNMANNED AIRCRAFT SYSTEM (UAS)

CROSS-REFERENCE TO RELATED APPLICATION

This application claims the benefit of U.S. Provisional Application No. 62/194,970 filed Jul. 21, 2015, which is incorporated herein by reference in its entirety.

FIELD OF THE DESCRIPTION

This description relates generally to design of an unmanned aircraft (or aerial) system (UAS) and, specifically, to an Automated Readiness Evaluation System (ARES) of use with a UAS (and UAS incorporating or configured according to such an ARES). The description relates to software, hardware, and computer-based methods for the automatic configuration, calibration, and deployment of a UAS to accomplish a user-defined task and the configuration, calibration, and/or deployment may be performed based on the skill of the user or operator of the UAS.

RELEVANT BACKGROUND

Recently, there has been a rapid expansion in the production and use of unmanned aerial vehicles (UAVs) for personal and commercial use. Adoption of the UAS is rapidly expanding as cost and availability have been lowered. Previously the domain of the military, usage of UASs has expanded to commercial and civilian industries. A UAS may include multiple elements including an aircraft (e.g., fixed wing, rotor-wing, lighter than air, hybrid, mini, micro, or nano aerial vehicle), a human(s), a payload(s), control(s), and communications. The UAS subsumes the UAV class as a UAV may be a component of a UAS and can include a fixed-wing airplane, a helicopter, a multi-rotor copter drone, a balloon, a dirigible, a tethered dirigible or blimp, a zeppelin, or a stationary or mobile airship. UAVs may also be called drones, unmanned aircraft systems, remotely piloted aerial vehicles (RPAV), remote piloted aircraft systems (RPDA), or unmanned aircraft (UA).

The UAS may be configured to perform a multitude of tasks ranging from flying-for-fun to large equipment inspection to remote sensing of the landscape. While a user, be it an individual or an organization, may benefit from the use of a UAS, there are a number of reasons why it is often difficult to successfully accomplish a task. As one example, a UAS has multiple variables that must be assessed for successful task (or mission) completion. This has traditionally required a UAS mission planner(s) to determine the parameters of a mission to ensure successful planning, staging, launching, flight, and recovery. The planner must consider if all components of the UAS are properly connected and configured, if all hardware and software are compatible, and account for the complexity of the system. The planner must also determine the data set acquisition and the methods of collecting data, which may include the following: the dataset is identified; a method is devised to collect the data considering which sensors can successfully acquire the goal; the UAS platform for acquisition is identified considering size, weight, power, endurance and other factors necessary for a successful mission; and the feasibility of collection is assessed as the planner determines if the UAS is technologically capable and fiscally possible.

The difficulties associated with successful UAS operation and mission completion are amplified when considering the multiple variables for success. As one non-limiting example for illustrative purposes, each type of UAV (e.g., a component of the UAS) has benefits and drawbacks that must be balanced for a successful mission. A fixed wing aircraft may have a longer flight time and a higher altitude, but launch and recovery can be logistically complicated and require higher skills or resources (e.g., a landing strip, a catapult or a vehicle or hand launch, and so on). Rotor wing aircraft, in contrast, may easily take off and land utilizing vertical technology (such as vertical takeoff and landing (VTOL) technology) but are limited to a lower altitude and provide less flight distance. Users can be overwhelmed by all of the considerations and variables for a successful UAV mission. As a further non-limiting example, payload variables must also be calculated. A payload may include aerial remote sensing, cargo, weapons, surveillance, communications, or a combination of multiple payloads. Sensors may be combined into a single payload or a payload may be dispensable like pesticides or dispersants, and payloads may vary over the mission or task. A user must determine the payload capacity and the sensors to accomplish the task.

As the availability and adoption of UASs have increased, the role of the mission planner has expanded from highly skilled professionals to include hobbyists and non-professionals. A novice may purchase a UAS and attempt to accomplish a mission, such as data acquisition. However, without adequate knowledge of the complexity of the system and accounting for the multitude of variables required for successful task(s), novice and even very skilled users may experience frustration, destruction or damage of aircraft, lost aircraft, loss of time, loss of resources, failure to accomplish a task, and lack of safety and accidents.

There has been some initial efforts and discussions regarding increasing UAV flexibility by utilizing mission dependent modules, such as those found in WO 2015073687, DE 102013000409A1, DE 102008014853A1 (and B4), and DE 102006013402. While useful, these initial works generally describe combining modules, but, in all cases, the burdens of determining the correct components for a task, combining the modules in the correct arrangement for operation, and maintaining airworthiness all fall to the user. Size of the drone and UAV type are also restrictive parameters in the mentioned prior works on increasing UAV flexibility.

One researcher has proposed a system and software to increase the flexibility of a UAV (e.g., as described in U.S. Pat. Nos. 6,665,594 and 6,873,886 for plug-and-play payload modules). In this system, each module has its own software that uploads to a central onboard computer that networks to the human ground operation computer. While aiding in calculating payloads for a UAV, the suggested system does not solve many of the fundamental difficulties of the UAS including requiring a user to choose the correct components and generate a configuration to accomplish a particular task or complete a desired mission.

SUMMARY

The inventors recognized that prior UAV work that contemplated mission modules, including payloads, had failed to consider or work with an entire system (i.e., a UAS) to correct the many complications and account for the many variables that can go wrong when trying to achieve a desired task (e.g., with a particular UAV). Instead, the prior work toward increasing UAV flexibility focused extensively on the aircraft (drone) component of the UAS but failed to consider that successfully and safely accomplishing a task is more than a UAV but is an entire system. Furthermore, in the prior work, the user of the UAS was forced to perform many of the necessary calibrations of the UAS for operation including, but not limited to, power distribution, flight control, range and altitude control, data processing, and similar.

The prior work did not account for the skill of the user. A highly skilled professional (or individual) may possess the capability to successfully configure and operate, but a novice operator or user may not be successful in task completion and may endanger people, objects, the surrounding environment, or other aircraft. Safe operation, a primary concern when unskilled users are operating aircraft, is also not contemplated in the prior research in combination with task completion. UAVs and UASs remain inaccessible to many users because of the need for specific knowledge.

Hence, there remains a need for systems and methods for providing a UAS that can be easily, and safely, adapted to suit particular needs or tasks without reinvestment or advanced knowledge of software and flight systems. The systems and methods of the current description will improve the user experience of UAS and UAV, increase potential applications for unmanned systems, and will aid in the adoption of the technology and gathering of data. The systems and methods described herein lower the time and cost to deploy a UAV with a UAS but also significantly increase the likelihood of mission success for even a novice user or operator.

To address the above and other problems, the present description teaches or provides methods and systems for an Automated Readiness Evaluation System (ARES) that is configured for a particular task or application selected by the user based upon their level of specific knowledge. In particular, the systems and methods taught herein provide for the configuration, assembly instruction, calibration, and operation of a UAS. The ARES serves as a mission planner by calculating the mission parameters for a user-selected task to minimize mission failure by determining the variables for task completion and providing instructions to a user for construction and operation (e.g., of the UAS). For example, the UAS configuration data may be generated based on input from the user regarding their needs and planned task, and this task selection data may be used by the ARES to generate a UAS configuration and instruction for the user. The ARES performs error checking to ensure correct UAS configuration, calibration, and deployment.

The system may include: (1) a plurality of UAS components with interconnections that have identification protocols to provide both a physical and a data connection to communicate task capabilities; (2) an ARES user device for task selection and input of user skill level (specific knowledge of UAS); and (3) a Dynamic Evaluation System (DES) that possesses computational abilities to interpret the identification protocols and associated data and perform the user identified function by providing a configuration to the user by combining components (omitted or utilized as needed to accomplish select task), error checking, calibration, deployment, data processing, management for the UAS, safety, and more.

In a further embodiment, a system for the ARES is provided, which includes: (1) a task repository to select a task; (2) a skill level repository to select skill level for aircraft operation; (3) a module data repository containing the information on the capabilities and specifications for each hardware component; (4) a user device; (5) hardware modules with associated data; and (6) an optional base system pre-configured for a task.

Additionally, according to one aspect of the description, methods are provided for configuration and operation of the ARES based upon a user selected task. The method, for example, may be configured to include: (a) analyzing hardware modules and collecting the associated module data; (b) determining if the system can accomplish a user-defined task (which may include aiding in task completion); and (c) determining if the system is airworthy, determining whether the system can be operated safely by a user, and undertaking automatic calibration.

In some implementations, the ARES is adapted to work with an existing UAS by use of quick response (QR) codes, radio-frequency identification (RFID) technology, computer vision, or other means of identification of existing component parts. These identification elements (e.g., tags, chips, markers, labels, and the like) may be provided by component manufacturers and applied to parts or be applied, after-market, by a user. In another embodiment, though, the ARES is composed of new individual component parts or a plurality of parts in task-specific modular kits.

In some useful embodiments, the system (and associated methods) may be configured such that it performs task selection, system configuration, calibration, and operation for a UAS presented by a user, or client, based upon their level of specific knowledge. The systems and methods may provide for calculation, instruction, configuration, construction, deployment, and management of a UAS. The ARES serves as mission planner to remove the complexities of UAS missions and increase successful completion.

In one illustrative embodiment, a method is provided for task selection by the user, and the method includes determining if the system can accomplish a user-defined task and aiding the user in task accomplishment. A further method is provided for analyzing hardware modules and collecting the associated module data to ensure the system is configured correctly for a task. In another embodiment, a method is provided that utilizes module data to determine if a task can be completed by a user. In another embodiment, a method is provided for the configuration and calibration of the UAS.

In some embodiments, the user input and display device of the system is a mobile device. In another embodiment, though, the user input and display device may be a singular device or a plurality that may include a smart phone, laptop or desktop computer, tablet, personal digital assistant (PDA), wearable device, wearable helmet system, smart watch, or another device capable of display and input. In the same or other embodiments, the vehicle(s) in the UAS can include a terrestrial vehicle(s) (e.g., a truck, car, motorcycle, train), an aerial craft or vehicle (e.g., an aircraft, helicopter, glider, drone, fixed-wing airplane, multi-rotor drone), a water vehicle(s) (surface or submersible), a robotic vehicle(s), other vehicle (e.g., a hovercraft, seaplane, amphibious), a space vehicle, or a hybrid vehicle of the aforementioned categories, and any of these vehicles may be considered a UAV for use in a UAS according to the description and is contemplated for use by the inventors.

Benefits of the current systems and methods include: the ability to expand beyond aerial vehicles to ground, air, water, space, and unmanned or manned vehicles; incorporation with miniaturization as component parts become smarter with advances in hardware technology; the ability to adapt to technological advances in component parts such as renewable power or electric power, material advancement as newer materials are utilized for less weight; and scalability to upsize or downsize dependent on missions.

Further aspects of the description will become apparent from consideration of the drawings and ensuing description of preferred embodiments of the invention. A person skilled in the art will realize that other embodiments of the invention are possible and that the details of the description can be modified in a number of respects, all without departing from the inventive concept(s). Thus, the following drawings and description are to be regarded as illustrative in nature and not restrictive.

BRIEF DESCRIPTION OF THE DRAWINGS

The features of the description will be better understood by reference to the accompanying drawings which illustrate representative embodiments of the description. In the drawings.

DETAILED DESCRIPTION

The following description provides a new unmanned aerial system (UAS) that is specially configured with an automated readiness evaluation system (ARES) to perform or have the functionalities described herein. The present description is directed to method and systems for combining UAS component modules with a Dynamic Evaluation method (performed by the ARES) to quickly and accurately accomplish a task based on specific UAS knowledge. Briefly, the ARES of the various embodiments described herein provides or yields an UAS that can accomplish a need or task without advanced specific knowledge of mission planning or of flight and without reinvestment in hardware. By serving as a mission planner, the ARES calculates the mission parameters for a user selected task and aids the user in configuration and operation. The ARES determines the variables for task completion, thereby ease of use and safety are improved with inclusion of the ARES in a UAS and the user experience and likelihood of mission success are increased.

With the use of the ARES, users do not need to plan the correct configuration for tasks, perform calibration for operations, or possess the knowledge of all the complexities of flight and mission planning. As an overview, the ARES includes components (hardware and software as shown in UAS system 100 at 110) for analyzing UAS hardware and software, for calibrating the UAS ensuring the system is safe and airworthy, and for configuring the system for task completion and aiding in task accomplishment. It will be clear from the following description that the ARES of the various embodiments (as shown at 110 in the UAS 100 of FIG. 1) can design a UAS configuration, determine if it is correctly configured and calibrated for a task, determine if the system can be operated safely, and aid in accomplishing a task. By removing complexities associated with mission planning, the barrier to entry of UAS use is lowered and likelihood of mission success increased even for a novice operator of a UAS.

Figure 1:
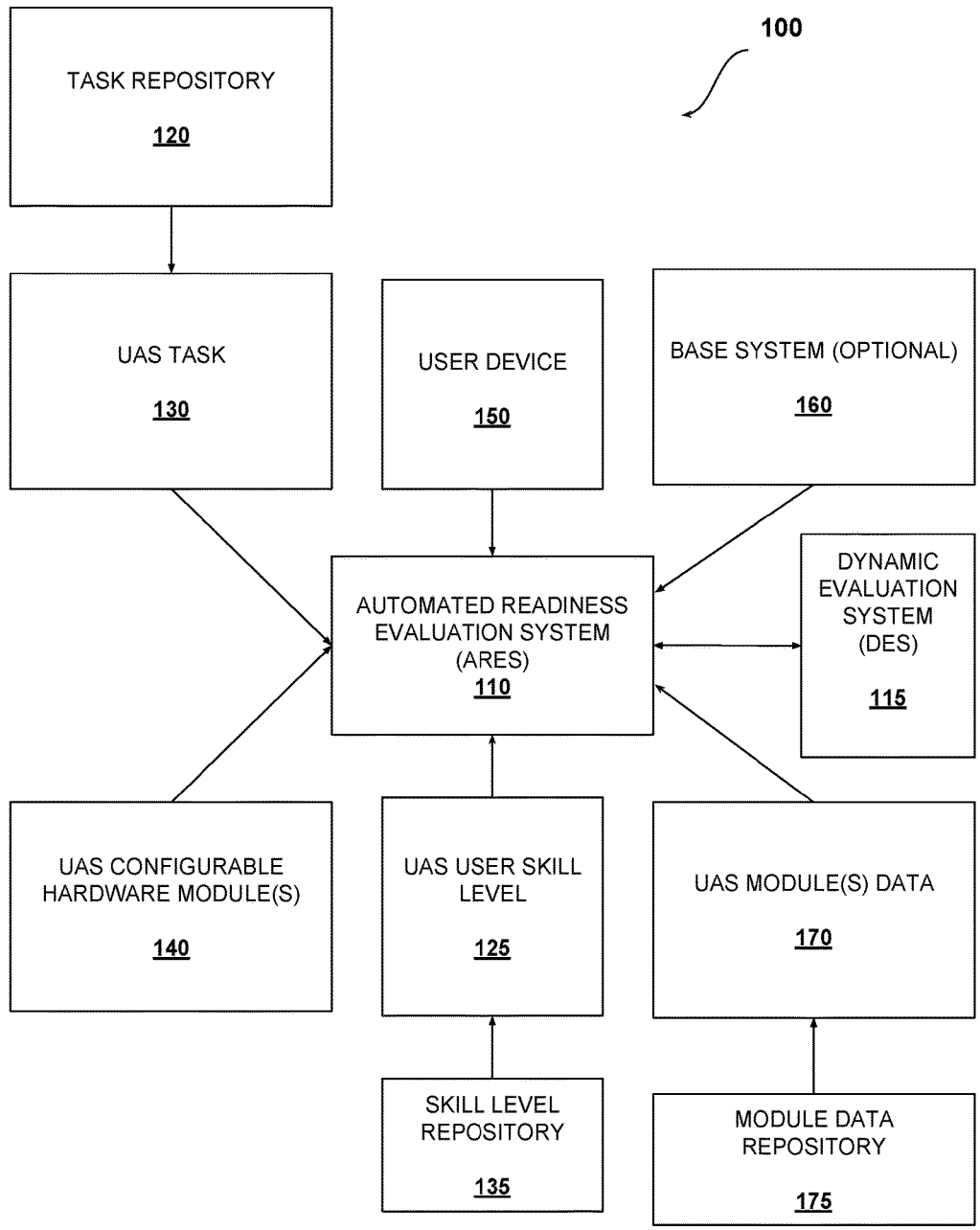
FIG. 1 is a functional block illustration or schematic of an exemplary system (e.g., a UAS) with its components including an Automated Readiness Evaluation System (ARES)

FIG. 1 illustrates a UAS 100 that includes an Automated Readiness Evaluation System (ARES) 110. The ARES 110 possesses built in computational abilities (e.g., a processor(s), memory, and software or code executed by the processor) to perform one or more selected functions. This function may be one or more of: (1) providing a configuration to the user by combining components (omitted or utilized as needed to accomplish select task); (2) calibrating the system 100; (3) evaluating flight parameters and safety; and (4) error checking.

As shown in FIG. 1 (e.g., with the arrows between functional blocks), the system or ARES 110 receives or accesses information (such as in memory of the system 100 or ARES 110). The ARES 110 acts to combine and/or process this information from a Dynamic Evaluation System (DES) 115, task repository 120, UAS task 130, UAS component modules 140, a user device 150, and module identifying information 170. Further, a skill level repository 135 provides a selection of UAS skill levels 125 to the ARES 110.

Also, in some embodiments of UAS 100, a module data repository 175 presents UAS module data 170 to the ARES 110 for processing or use in performing the methods described herein. A base UAS 160 with preconfigured components is optional in the UAS 100. A full description is provided below with reference to FIGS. 6, 8, and 9 as to how components or UAS configurable hardware modules 140 are combined by system or ARES 110 to complete a particular UAS task 130. It should be understood that redundancy in software and hardware, and backups, are typically built into the ARES 110 to maximize safety and as a failsafe for object avoidance.

Figure 2:
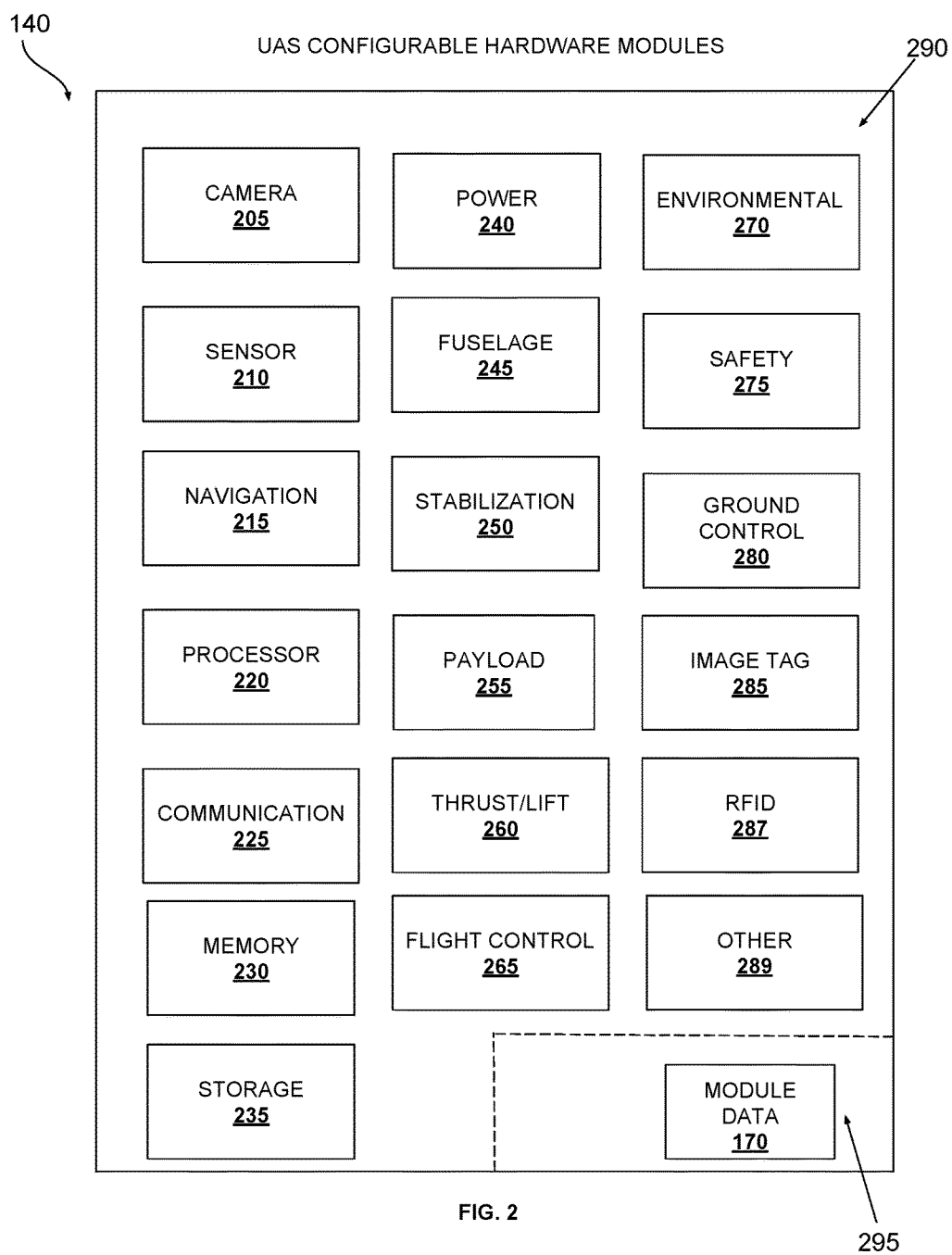
FIG. 2 is a functional block diagram of the UAS hardware and software component of the system of FIG. 1.

FIG. 2 details one preferred embodiment of the UAS scalable and customizable (e.g., by the ARES 110) hardware modules 140. The UAS modules 140 may include, but are not limited to: hardware components 290 and a software component 295 including module data 170 (e.g., in memory accessible by the ARES 110 as shown at 230 or 235). The hardware components 290 may include: a camera 205; sensors 210; navigation elements 215; a processor 220; communication devices 225; memory 230; data storage 235; power components 240; a fuselage 245; stabilization mechanisms 250; a payload 255; a thrust mechanism 260; flight control devices 265; environmental sensors 270; safety hardware 275; ground control 280; an identifying image tag 285; and identifying RFID tag 287; and other hardware 289.

Note that these components can be combined in a plurality of arrangements ranging from utilizing a single element to all components or redundant components (there can be multiple cameras 205, multiple sensors 210, multiple processors 220, and so forth) to minimize system failure. The hardware components 290 can be combined or omitted as needed.

The camera 205 may include plurality of cameras for remote sensing thermal, aerial photography (at different resolutions), video, visual spectrum, and infrared imaging. An example of sensor(s) 210 may include multi-use sensors to minimize swapping, motion, ultrasonic, magnetic field, accelerometer, gyroscope, optic flow, laser range finders, acoustic, synthetic vision, thermal imaging, remote sensing cameras, optical sensor packages (cameras), infrared (IR) cameras, RADAR, and electro-optical (EO) cameras. The processor 220 may include one or more CPUs, GPUs, FPGAs, specialized processors, or other processors for data processing. The communication devices 225 may include, but are not limited to, a data link, line of sight radio frequency, beyond line of sight satellite technology, cellular, internet, Bluetooth, Ethernet, satellite, WiFi, cloud connections, wireless, transponders, streaming apparatuses, and other wired and wireless technologies that may be used for control and command information sent and received between ground control and an aircraft. Such a communication link 225 to an aircraft can return data to the ground such as images. For example purposes, in method 600 shown in FIG. 6, the ARES determines whether images or other onboard data will be stored onboard or returned via communication uplink.

Memory 230 may include volatile memory, e.g., RAM (e.g. DRAM, SRAM, FeRAM, CBRAM, PRAM, SONOS, RRAM, NRAM, 3D RAM) or other suitable memory. Data storage, 235, may include non-volatile memory, e.g., solid state, flash, optical, magnetic storage (e.g., hard drives), millipede, SD cards, USB, or other available storage. Power sources 240 may include one or more batteries, electrical power, liquids such as gasoline or hydrogen, a renewable energy source such as solar or wind, may be rechargeable, or any other suitable power source. The fuselage 245 may include a fuselage, UAV frame(s), fin(s), and prop(s). It may also include specific appearance of the fuselage, such as camouflage. Electronic gyrostabilization and vibration suppression may be included in the stabilization mechanisms 250.

The payload 255 may include dispersants, deliverables, or other payloads. The thrust mechanism 260 may include motors, fans, engines, and similar devices. Flight control 265 may include electronic speed control. Environmental sensors 270 may include sensors for sensing pressure, humidity, light, UV, temperature, and wind speed as well as sensors for current detection for underwater operation. The sensors may be a barometer, calorimeters, heat rate sensors, sun sensors for spaceborne operation, and other environmental sensors. The safety hardware 275 may include an obstacle avoidance system, proximity sensors, GPS, geofencing to ensure an aircraft does not enter restricted airspace or fly higher than permitted, and/or a kill switch to disable aircraft operation.

Ground control 280 may include devices or components for human control of the vehicle that can range in complexity from a small, portable ground control unit of computer display and radio control used by one user to a facility with multiple operators to control specialized tasks such as navigation, payload, and communications. This may include remote control. The identifying image tag 285 may include a 2D or 3D barcode, QR code, a barcode in black and white or with shading, a barcode with other patterns such as 3D patterns or designs, an irregular pattern, variable size and shape, an imprinted pattern, or a hologram, and it may have encoded data. The identifying RFID tag 287 may include an antenna sending out a radio frequency and may contain data. Other components may be included as shown at 289, such as cooling, warning alarms, USB or other ports to connect to peripherals such as a computer. The UAS configurable hardware component parts may be hot-swappable and consist of a plurality of components. The software 295 typically includes module data 170 that is communicated to the ARES 110.

Figure 3:
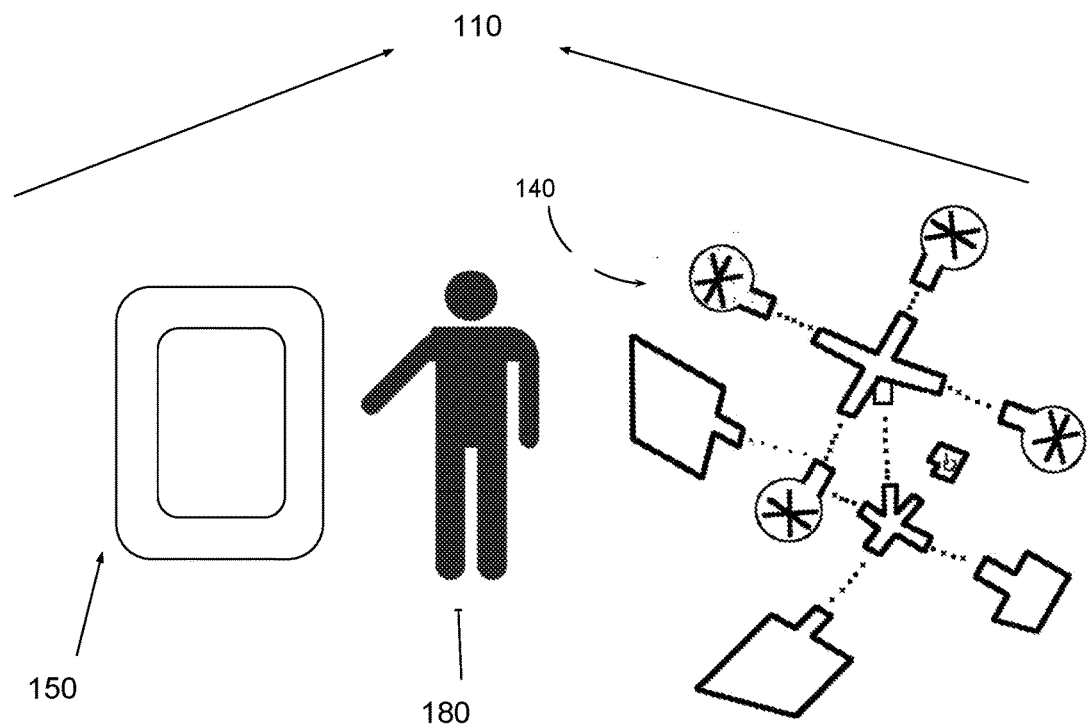
FIG. 3 illustrates with a functional block or schematic diagram one embodiment of a task and skill specific ARES.

In one embodiment of a system (e.g., a UAS) implementing an ARES (such as ARES 110), FIG. 3 illustrates how the user (or operator) 180 operates the user device 150 shown in system 100 in FIG. 1 to do selected UAS task 130 at their current skill level 125. This may involve the ARES 110 executing the ARES methods 600, 800, and 900 to configure, calibrate, and safely operate the UAS/system 100 of FIG. 1. The UAS configurable hardware/software modules 140 are illustrated as a quadcopter, but the modules 140 could take a range of aircraft forms including single copter, fixed wing aircraft, or any other form of rotary or fixed wing aircraft (or hybrids) ranging in size and complexity. It is specifically contemplated that the ARES-based system 100 may include one or more users, user devices, and modular components, including aircraft or drones or other vehicles, capable of working in cooperation.

Figure 4:
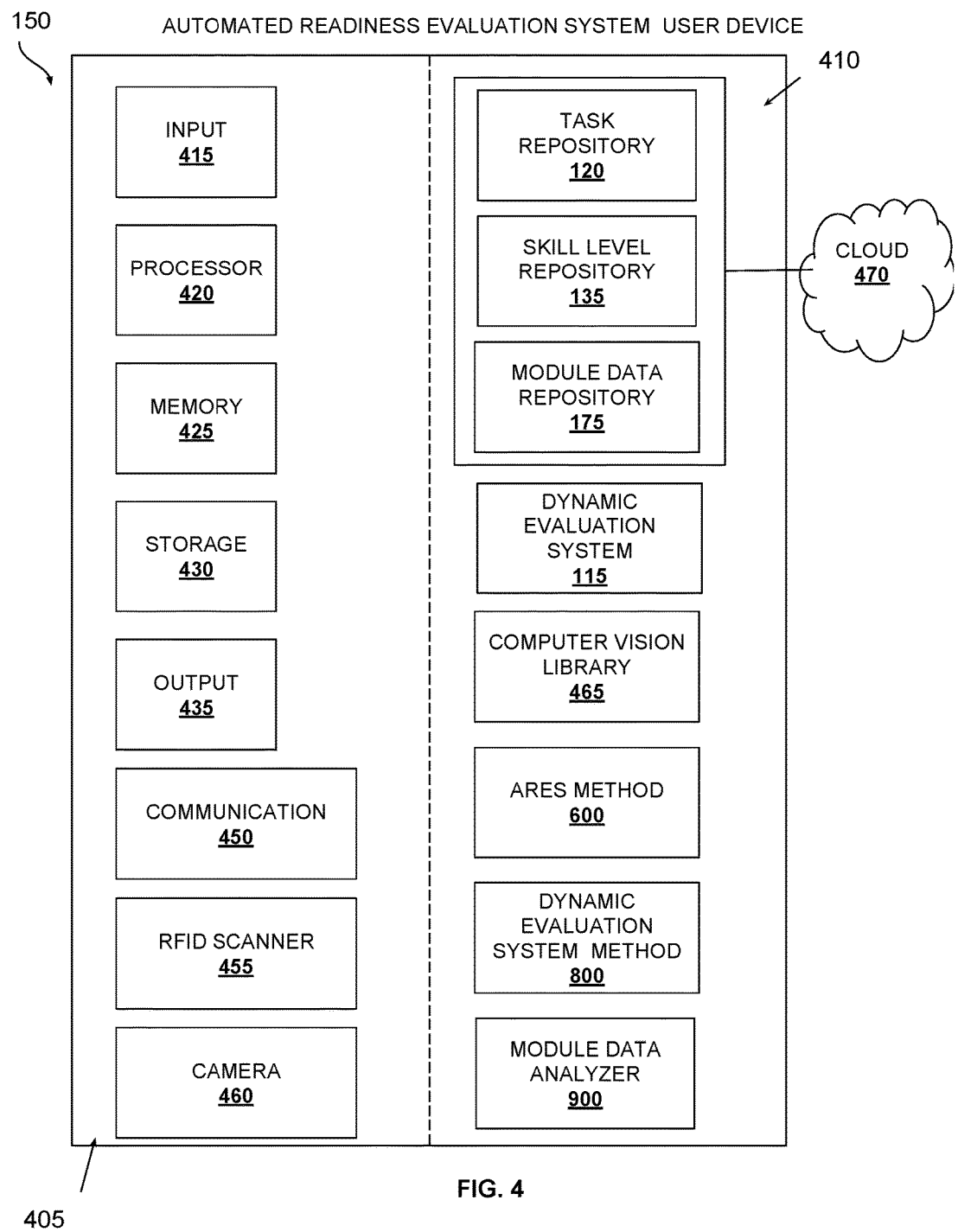
FIG. 4 is a functional block or schematic diagram of a viewing or user device configured for implementing the ARES methods described herein such as the methods of FIGS. 6, 8 and 9, such as for use within an ARES.

FIG. 4 illustrates one design or useful embodiment for an ARES user device 150 of the UAS/system 100 of FIG. 1. As shown, the ARES user device 150 includes hardware 405 and software 410 that are used in combination in an ARES-based system 100 capable of accomplishing a user defined task. A processor, CPU, FPGA, or other specialized processor 420 directs or runs software 410 and manages memory 425 and input components 415 (which are optional in some embodiments). The processor 420 also communicates with RFID scanner 455 or camera 460 to receive input images for module information 170 utilized in method 900 to collect module data and provide it to ARES 110. In an alternate embodiment, device 150 contains a barcode reader. Communication element(s) 450 may be configured to communicate with a network (e.g. Internet, intranet, wireless, or the like) where communication protocols can include wireless, time-based, amplitude, laser, digital, one way, two way, location-based, near-field, and/or a combination.

The memory 425 of the device 150 may be used to execute methods 600, 800, and 900 and to load repositories 120, 135, and 175 from storage 430. Memory 425 may hold or store data obtained from camera 460, input 415, or RFID scanner 455. This camera input may include an input image, recognized via computer vision 465, to method 900 at step 945 and other data for the correct operation of the user device 150. Software 410 may be stored in memory 425. Data storage 420 may include flash based storage, a hard disk, an SD card, USB, or other storage mediums. Data storage 430 may also be used to store software 410 including the task repository 120 (shown in FIG. 1), skill level repository 135, module data repository 175, DES 115, ARES methods 600 and 900, DES method 800, and computer vision library 465 utilized in method 900 for identification of modules. The user device 150 may download repositories 120, 135, and 175 from cloud 470. In an alternate embodiment, all of the software 410 may be cloud-based. During operation of the user device 150, the methods 600, 800, and 900 may be executed to configure and calibrate the UAS/system 100 and ensure successful completion of the task 130.

Figure 5:
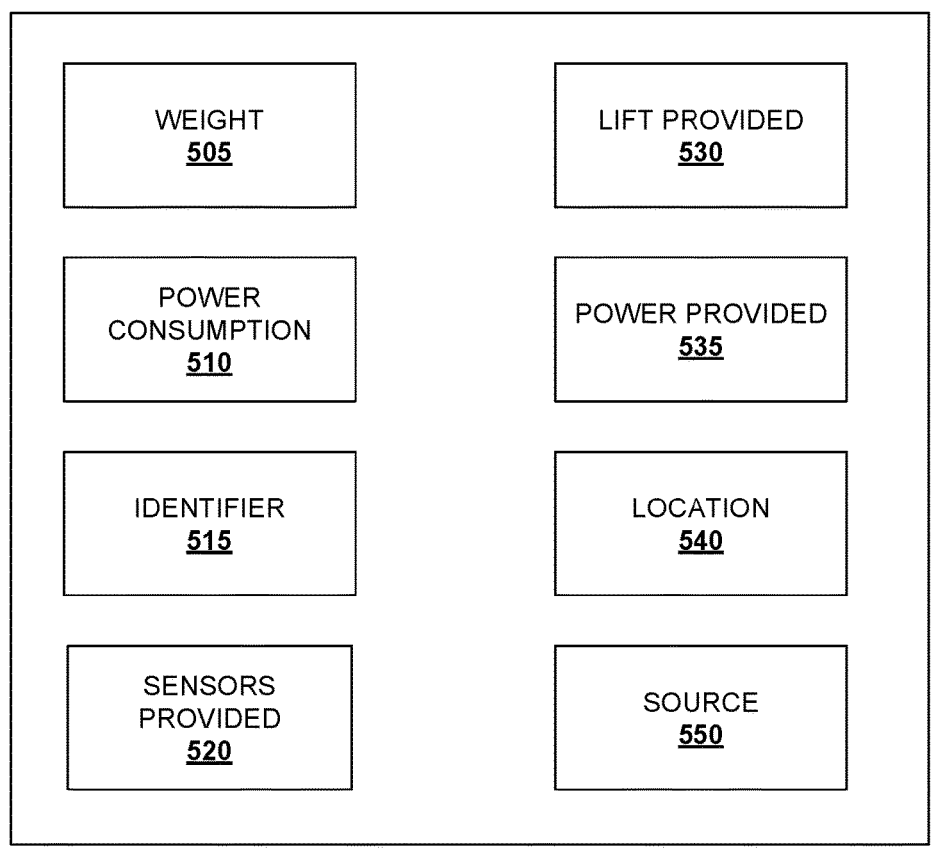
FIG. 5 is a functional block or schematic diagram showing the data associated with each component of the system hardware.
Figure 9:
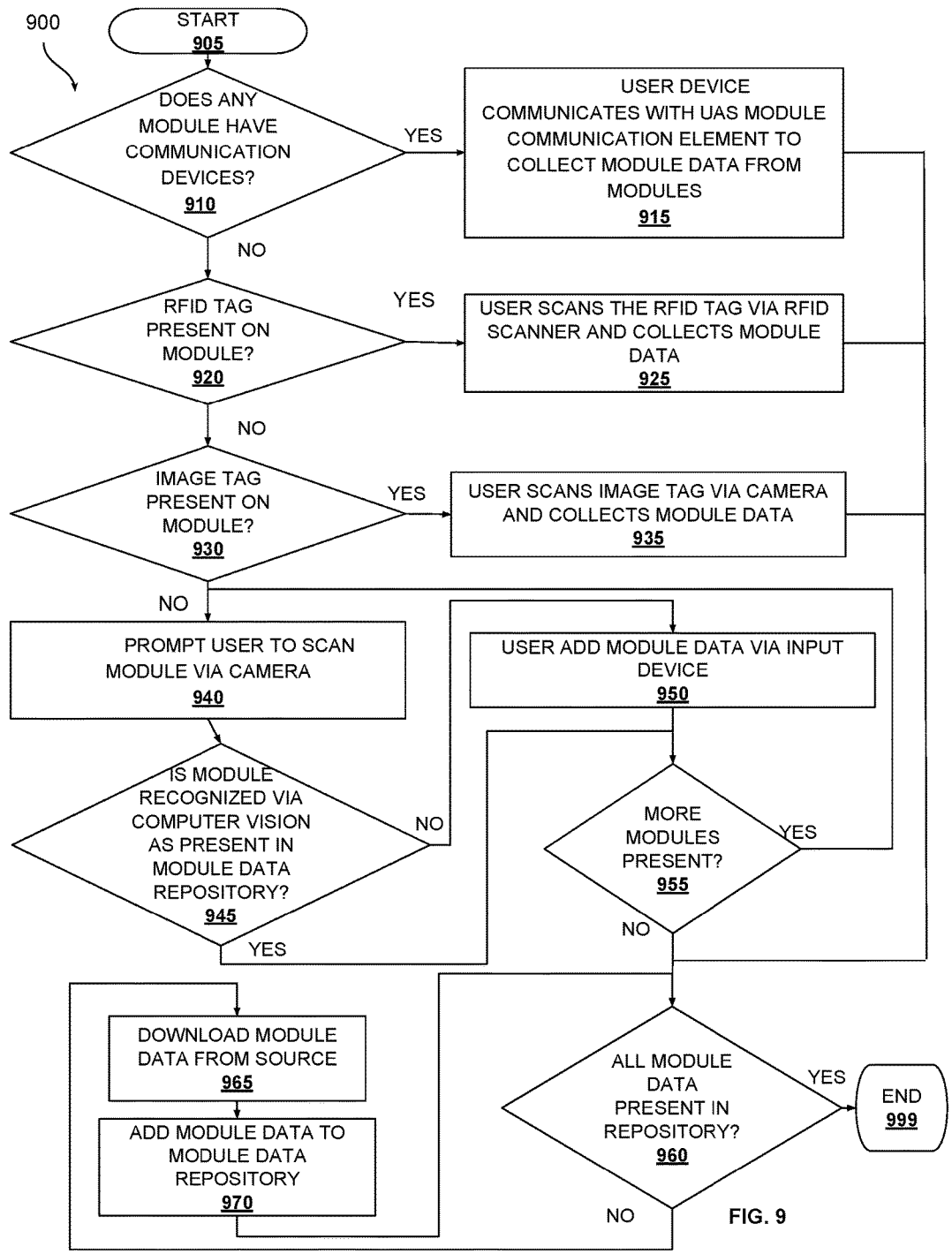
FIG. 9 is a flow diagram of an illustrative embodiment of a method performed by the ARES for analyzing hardware modules and collecting the associated module data.

FIG. 5 demonstrates one preferred embodiment of data 170 of the modules 140. The module data 170 includes the data that is provided to ARES 110. The module data 170 is provided to or used in execution of method 800 by the DES 115 to determine if the UAS is airworthy, can be operated safely, and calibrated correctly to accomplish the selected UAS task 130. The module data 170 includes, but is not restricted to: weight, 505, which can be utilized in multiple steps of method 800 to calculate necessary lift provided and distributed to maintain airworthiness of the aircraft component of the UAS 100 (e.g. steps 835, 845, 855, and 865); power consumption 510 that can be utilized in method 800 calculations (e.g., steps 845, 855, and 865); identifier 515; sensors provided 520; lift provided 530, which can be utilized in steps 835, 845, 855, and 865 of method 800; power provided 535, which may be utilized in steps 835, 845, 855, and 865; and location 540, which can be used in multiple steps of method 800 to aid the user in the correct configuration, or reconfiguration if necessary, of the UAS 100 (e.g. steps 820, 830, 840, 850, and 860). The module data includes source data 550 indicating where module data 170 was obtained (e.g., from a link to the Internet, from the module data repository 175, from the UAS module(s) 140 itself, entered by user/operator 180, or the like) and is utilized in step 965 of method 900 as shown in FIG. 9 to add module data 170 from a source 550 to the module data 175.

Figure 6:
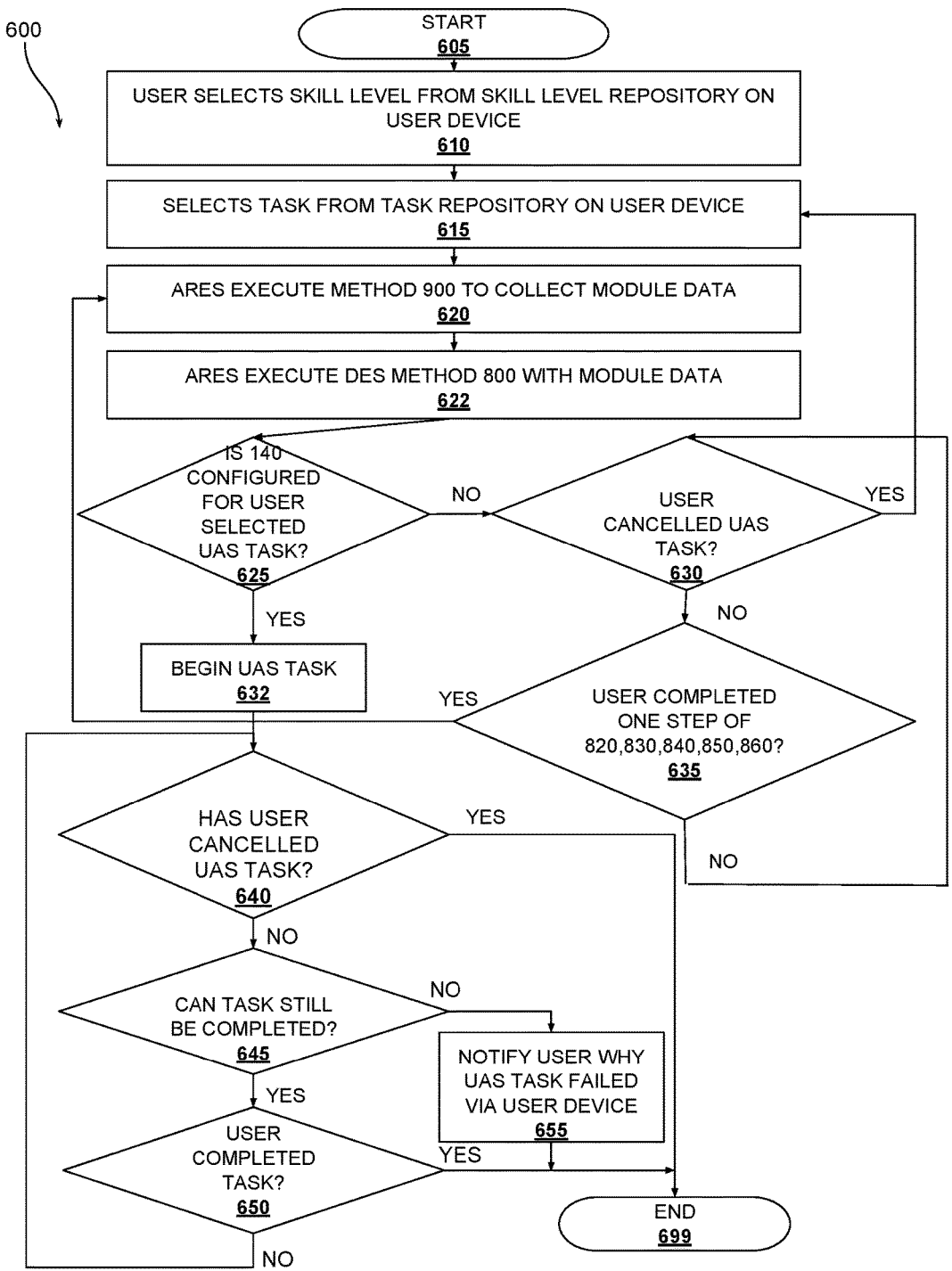
FIG. 6 is a flow diagram of an illustrative embodiment of a method performed by the ARES for determining if the system can accomplish a user defined task and aiding the user in task accomplishment.

FIG. 6 illustrates a method 600 (performed by the ARES 110 of system 100 of FIG. 1) for determining if a user can accomplish a task and aids the user in successful completion of said task. The method 600 starts at 605 when user 180 decides to perform a particular UAS task (or user-selected task) 130. For example, a user device such as device 150 may have input components 415 operated by user/operator 180 to start the method 600. The method 600 may be used to determine if a user can accomplish a task and aid in task completion.

In the method 600, at step 610, the user/operator 180 selects (e.g., via interaction with the user device 150 to provide selections to ARES 110) their level of specific knowledge 125 from the skill level repository 135 using device 150 (note, the UAS user skill level 125 is further explained below with reference to FIG. 10). In step 615, the user/operator 180 selects task 130 from the task repository 120 on device 150 (note that UAS tasks 130 or their components are further illustrated in FIG. 7). The skill level entered in step 610 can determine the level of ARES 110 involvement and may limit the task 130 displayed to user 180 in step 615.

At 620, the method 900 is executed on UAS modules 140 by the ARES 110 to collect module data 170. Module data 170 is utilized in step 622 to execute DES method 800. The output of method 800 is marking 140 as correctly configured in step 870 or incorrectly configured in step 875 for the user-selected UAS task 130. This result is passed to step 625. If the UAS modules are not configured for the user-selected UAS task, step 630 executes. At 630, the method 600 (as performed by the ARES 110) determines if the user 180 has cancelled the task 130. If the UAS task 130 has been cancelled, step 615 is executed and the user 180 may select a new UAS task 130 from task repository 120. If the task 130 has not been cancelled, the method 600 continues to step 635 to determine if the user/operator 180 has completed one step of 820, 830, 840, 850, or 860 in method 800. If completed, the method 600 goes to step 620, and method 600 is executed to collect the current module data 170 and then execute method 800, step 622, to determine if the UAS 100 is now configured correctly. If not completed, the method 600 returns to step 630 and checks if the user 180 has cancelled the user-selected UAS task 130.

If the UAS modules 140 are configured for the user-selected UAS task 130, the method 600 continues at step 632 by beginning the task 130. Next, at step 640, the method 600 involves performing error checking by determining if the user 180 has cancelled the task 130 during operation. If the user 180 has cancelled the task, the method 600 exits as shown at 699. If the task 130 has not been cancelled, the method 600 continues to step 645 and determines if the user-selected UAS task 130 can still be completed. If step 645 fails, the user 180 is notified why the task 130 failed via device 150 in step 655 and the method exits at 699. Task failure in step 655 may be a fatal error that leads to task failure, e.g. change in environment beyond initial design parameters, hardware or software failure, or the user 180 not following task instructions.

If step 645 is successful, the method 600 continues to step 650 and checks for task 130 completeness. If the user 180 has successfully completed the UAS task 130, the method 600 exits at 699. If the task 130 has not been completed, the method 600 continues to step 640. The method 600 could be performed differently in different embodiments such as: ARES 110 exits and user 180 determines their next actions; ARES 110 lands the aircraft safely and possible partial task completion option is presented to the user 180 and accomplished.

Figure 7:
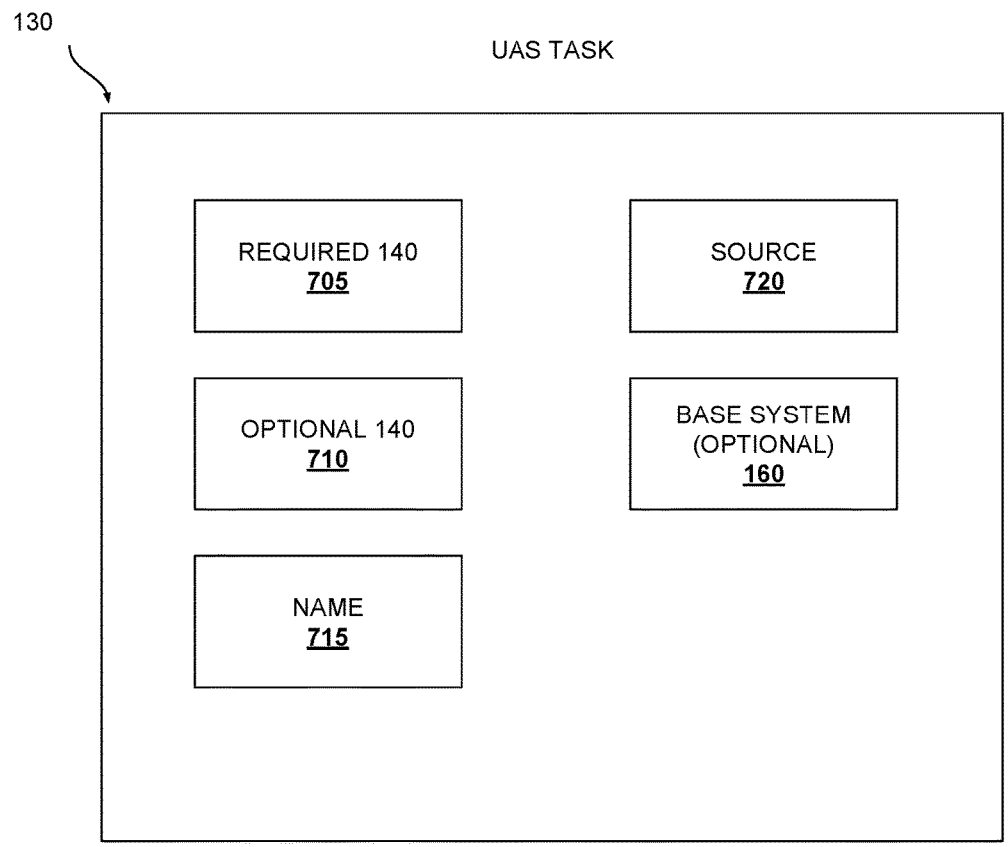
FIG. 7 is a functional block or schematic diagram showing the components of the UAS task.

FIG. 7 details one preferred embodiment of the components of a definition of a UAS task 130 that a user 180 may select to perform with a UAS 100. As shown at 705, a list or definition of the modules 140 is provided that are required for successful completion of the task. Optional modules 140 are defined or listed as shown at 710. UAS modules 140 may be optional in variations of a task (e.g., increase the range or power of the UAS 100 but not necessary for task completion) or not required to be removed from a UAS 100 to perform the task 130. The task name 715 may also be provided in the UAS task definition 130. The task 130 may also include as shown with reference number 160, an optional base system such as with an indicator of what base system is necessary or may be useful to accomplish the task 130. The base system 160 may include multiple components and a UAS 100 is not limited to a single aircraft as multiple base systems may be utilized. The task source 720 may be provided to define the task 130, and it can come from one or more sources including stored on the user device 150, input from the user 180 via element 415, obtained from cloud 470, from task repository 120, preconfigured tasks, a manufacturer, a third party, encoded on barcodes or QR codes or RFID (decoded via 455 and method 900), or a crowd sourced task. All modules 140 and methods of the ARES 110 are utilized to determine if everything is configured correctly for the task 130. The UAS tasks 130 may range from flying-for-fun tasks to professional applications including, but not limited to, climate research, satellite calibration and validation, powerline and renewable energy inspection, natural disaster search and rescue, weather, precision agriculture, and remote sensing.

Figure 8:
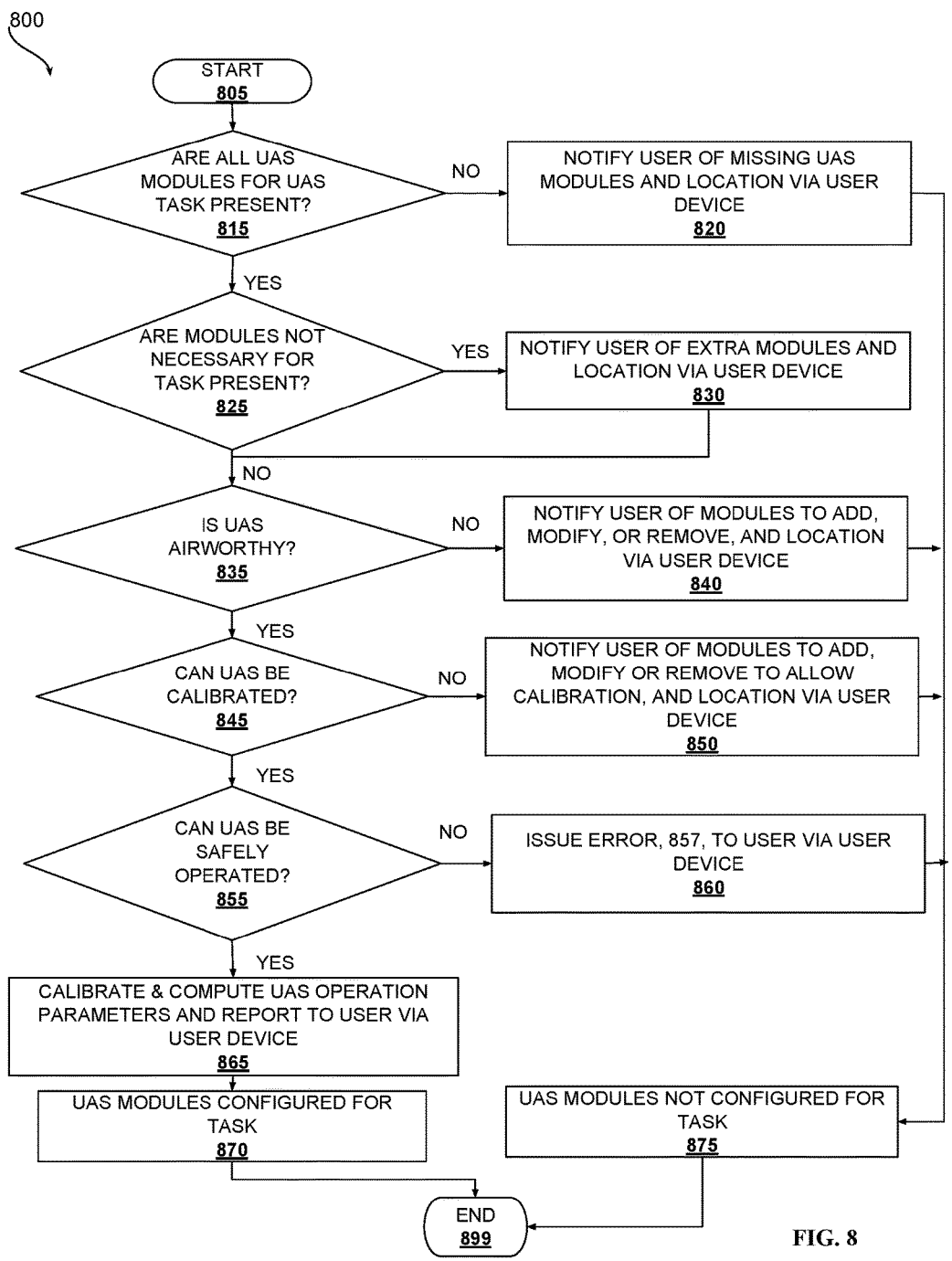
FIG. 8 is a flow diagram of an illustrative embodiment of a method performed by the DES for analyzing module data to determine if the system is airworthy and can be operated safely by a user and performing automatic system calibration.

FIG. 8 illustrates a method 800 (which is performed by the DES 115) for determining if the UAS 100 is ready for flight, undertaking calibration, and maintaining safety before, during, and after operation. The method 800 starts when called by method 600 at step 622 as shown at 805. At step 815, the method 800 includes determining if all the UAS modules 140 for the user-selected UAS task 130 are present. If step 815 fails, the method 800 continues to step 820 by notifying the user 180 of missing modules 140 and their location 540. The method 800 then continues with steps 875 and marks module(s) 140 as not correctly configured for the task 130 and exits at 899.

Step 825 is performed or executed when step 815 is successful and checks whether there are modules 140 not necessary for the task 130 present. If unnecessary UAS modules 140 are present, step 830 is performed and the user 180 is notified of extra modules 140 to remove and their location 540 and then continues to step 835. If there are not extraneous modules 140 present, the method 800 continues to 835. In step 835, the ARES determines if the UAS 100 (or combination/assembly of UAS modules 140) is airworthy. The specific details of how airworthiness is determined will vary but will generally include calculations for center of gravity, lift, weight, power consumption, and total power provided, all of which are available in the UAS module data 170. Such calculations are known by those skilled in the art and further description is not required to understand the method 800. If the assembly of UAS modules 140 (or the UAS 100) is not airworthy, step 840 is performed and the user 180 is notified of modules 140 to add, modify, or remove, and steps 875 and 899 are then executed. It should be noted that the configuration for a task 130 presented to the user 180 would be airworthy but step 835 is performed for error checking to ensure correct installation and/or assembly of the modules 140 by the user 180.

If the assembly of modules 140 (or UAS 100) is airworthy, the method 800 continues to step 845 with determination if the modules 140 (or UAS 100) can be calibrated (including, but not limited to, payload calculations, power distribution, flight control, range and altitude control, data processing, and similar). Step 850 executes if step 845 fails and notifies the user 180 of UAS modules 140 to add, modify, or remove and their locations 540. Steps 875 and 899 then execute.

If the UAS modules 140 can be properly calibrated, the method 800 continues to 855, which involves checking if the assembled modules 140 (or the UAS 110) can be safely operated (e.g. external conditions, skill level, environment and terrain, location (e.g. is the user 180 in restricted airspace?), and other factors as this is meant to be illustrative not exhaustive). If step 855 fails, the method 800 continues to step 860 in which the ARES 110 issues an error 857 to the user 180, and steps 875 and 899 execute and the method exits. If step 855 is successful, the UAS 100 is calibrated and operation parameters (e.g. flight time, altitude, power remaining) are computed and reported to the user 180 via the user device 150 in step 865. The method 800 continues to step 870 and the UAS modules 140 are correctly configured for the user-selected UAS task 130. The method 800 exits as shown at 899.

A method 900 is illustrated in FIG. 9 for analyzing (by operations of the ARES 110 of FIG. 1) hardware modules 140 and collecting the associated module data 170 utilized by the ARES 110. The method 900 starts when executed at step 620 in method 600 and determines if all necessary components 140 are present (e.g., correct payload, controller, aircraft, and so on) at 905. At 910, the method 900 involves determining if any module 140 contains communication elements 225. When communication elements 225 are present in the UAS 110 (or assembly of modules 140) as determined in step 910, the method 900 continues at 915 with a communication element 450 on user device 150 communicating with a communication element 225 on the UAS module 140 to collect module data 170 from/for the UAS module 140, and the method 900 continues to step 960.

If no communication elements 225 are present as determined in step 910, step 920 determines if an RFID tag 287 is present on the UAS module 140. If not, the ARES 110 determines at 930 if an identifying image tag 285 is present on the UAS module 140, and the method 900 continues to step 935 in which the user 180 scans the identifying image tag 285 via component (camera) 460 on the user device 150 and collects module data 170. The method 900 then proceeds to step 960. If an identifying RFID tag 287 is detected, the method 900 continues to step 925 in which the user 180 scans the RFID tag 287 via the user device 150 with an RFID scanner 455 to collect module data 170, and the method 900 then continues to step 960.

In step 940 (performed when no communication, RFID, or image tag are present), the method 900 prompts the user 180 to scan the UAS module 140 via a camera 460 using the user device 150. At step 945, the method 900 involves checking if the UAS module 140 is recognized via computer vision library 465 on the user device 150, as present in module data repository 175. If the module 140 is not recognized, step 950 executes, and the user 180 adds module data 170 manually via user device input 415, and the method 900 continues to step 955.

If the UAS module 140 is recognized, step 955 is performed including checking if more UAS modules 140 are present. If so, the method 900 then continues at 940 with recognizing additional UAS modules for inclusion in the UAS 100 (in the assembly as shown in FIG. 3). If no more UAS modules 140 are detected, the method 900 continues to step 960 with determining if all module data 170 is present in the module data repository 175. If successful, the method 900 ends or exits at 999. If step 960 fails, the method 900 continues to step 965 to download module data 170 from one or more sources 550, and this module data 170 is added to the repository 175 in step 970, and the method 900 continues by returning to step 960.

Figure 10:
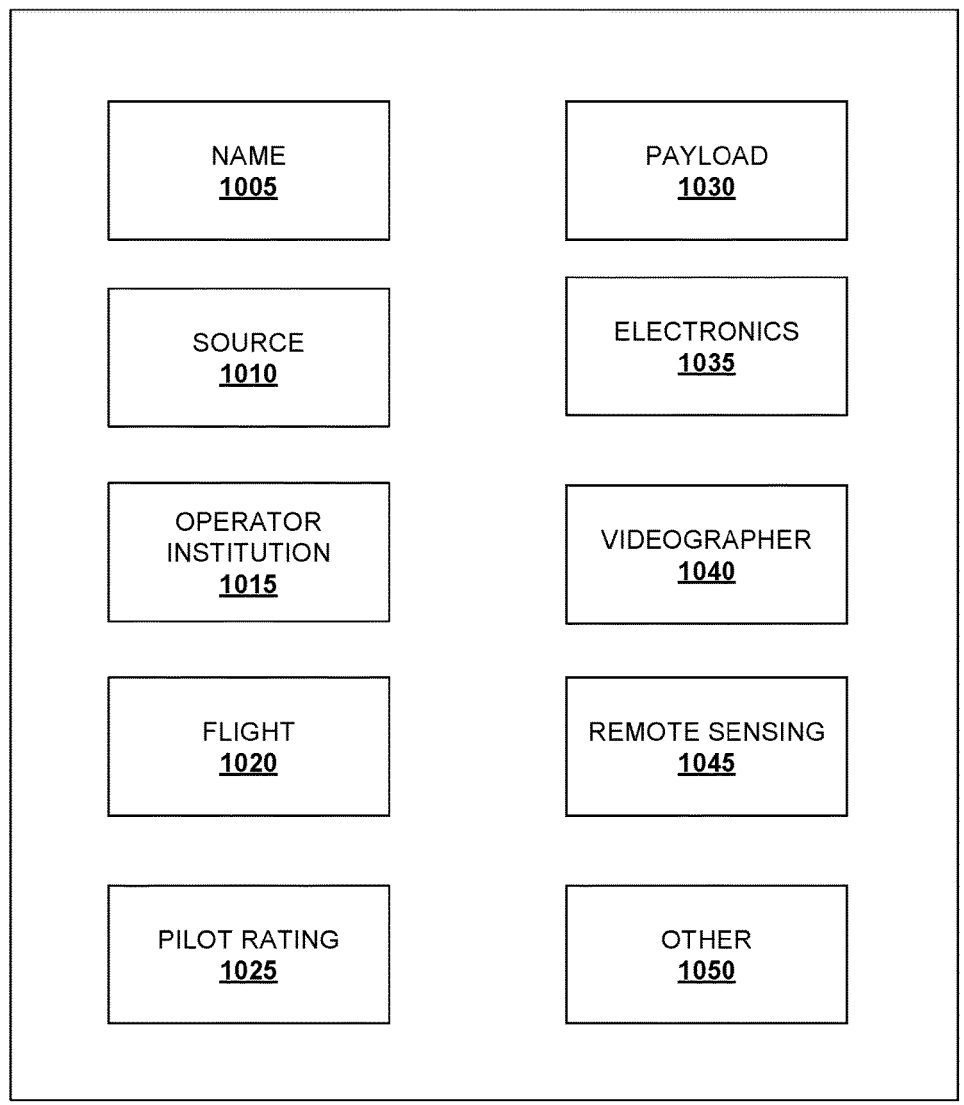
FIG. 10 is a functional block or schematic diagram showing the components of the ARES skill level.

FIG. 10 details one preferred embodiment of skill level 125 (or definition of a user's skill level for a UAS (or its UAV)) stored in skill level repository 135. The available tasks 130 displayed are based on the UAS user skill level 125 in step 615 of method 600. For example, if a user 180 lacks sufficient skill for a specialized task, e.g., weapons, it will not be presented as an option. The UAS skill level 125 also determines the level of ARES 110 involvement in methods 600 and 800. The UAS skill level 125 is displayed to the user 180 on user device 150 during skill level selection in step 610 of method 600. The components of a skill level in the example shown in FIG. 10 are: name 1005; source 1010; operator institution 1015; flight 1020; pilot rating 1025; payload 1030; electronics 1035; videographer 1040; remote sensing 1045; and other 1050.

A source 1010 may be provided from one or more sources including being stored on device 150 including input from the user 180 via input components 415, obtained from cloud 470, preconfigured skill level, a manufacturer, a third party, encoded on barcodes or QR codes or RFID, or a crowd sourced skill level. Multiple skills may be combined into a skill level in repository 135. The operator institution 1015 may include public operator (government institution, public educational institutions), military, or civil operator (citizens, private companies, private educational institutions). It is specifically contemplated that the ARES 110 can be configured for multiple users of varied skill level.

Flight 1020 is a perceived capability of the operator, e.g., an operator who lacks a rating or certificate but has experience. The pilot rating 1025 could be for official pilot ratings from a certified provider, e.g., instrument rated with associated medical qualifications. Payload 1030, electronics 1035, videographer 1040, remote sensing 1045, and other 1050 are non-limiting examples of specialized skills an operator may possess that could affect the configuration and calibration of the UAS.

Although some embodiments are shown to include certain features, the applicant specifically contemplates that any feature disclosed herein may be used together or in combination with any other feature on any embodiment of the invention. It is also contemplated that any feature may be specifically excluded from any embodiment of an invention.

With the above discussion and general discussion of an automated readiness evaluation system (ARES) understood, it may be useful to more specifically discuss functions of particular hardware components and control software of the system and the modules that comprise the UAS.

During the planning stage, an operator utilizes an ARES enabled UAS. The physical location of the ARES control software is not restrictive and may be located on a user device (e.g. downloaded by a smartphone, tablet, or other device), the cloud, loaded onto a device via means such as USB or wireless, ground control, or an aircraft. The DES may be located on the same device as the ARES but may also be on a complementary device, the cloud, ground control, aircraft, and similar where computation can be performed. The DES does not necessarily need to be located on the same device as the ARES but ARES requires communication with the DES. In some implementations, the user device may be a wearable device such as a smart helmet with Augmented Reality or may come pre-loaded on a device with a processor (or multiple processors) to execute ARES code. On an ARES enabled UAS, the ARES interfaces with the UAS primarily via wireless communication.

The operator selects their skill level using their user device. As an illustrative example, the operator is a member of a research team at an educational institution who lacks experience with a UAS but desires to acquire remote sensing data to locate ancient landscape modifications in a rainforest environment. The archaeologist lacks specific knowledge of a UAS (e.g. is a novice) but does have knowledge of remote sensing techniques. Based on the skill level and possession of remote sensing knowledge, the archaeologist is presented with a task list for selection. The task list is comprised of a pre-loaded task repository that has been augmented by crowd-sourcing, user input, or third-party manufacturers to ensure that it is expandable, comprehensive, and up-to-date. If the desired task is not available, the user may input task parameters or load the task into the repository from an outside source. The archaeologist selects a remote sensing task that is similar and then inputs additional parameters for ancient limestone ruins in a rainforest environment. Ancient limestone ruins in a rainforest environment may alter the appearance of overlying vegetation when viewed in color infrared, thereby indicating the presence of a ruin (a vegetation change that is otherwise not visible to the naked eye).

The ARES interfaces with all present components of the UAS through module component protocols and passes the information to the Dynamic Evaluation System (DES) to determine if the task can be accomplished based on the present and available components. The DES calculates the configuration necessary to accomplish the selected aerial remote sensing task including location, range, power requirements, monetary cost, and necessary components. If a remote sensing instrument providing color infrared is not available, for example, then the task cannot be completed and this error is given to the archaeologist on the user device. Other error messages may be given to the operator via their device if the task is not feasible given current conditions such as missing components, necessary components exceed the limit of the archaeologist's budget, the desired area of study is too distant, or the desired dataset is too large. An alternate configuration may be presented that may still lead to task success, although altered, such as a smaller study area than originally desired.

Assembly instructions for a correct UAS configuration are presented to the archaeologist on the user device. As the operator is a novice with UASs, the instructions are extremely detailed, e.g. text, pictures, animations or video, Augmented Reality instructions, and similar. If the operator possesses more experience with a UAS, the instructions may be a brief, e.g. a text list of required components. The user selects the correct components and assembles them; in this example the operator has a base ARES UAV with pre-assembled components common to a multitude of tasks (e.g. rotors, power source, ground control, stabilization, communication) and a color infrared camera for remote sensing with associated storage.

The components may be easily identifiable using a variety of means such a name, symbol, braille, or color. The archaeologist may use computer vision during assembly to check if the correct component has been selected or if the configuration is correct. The ARES communicates with the UAS to continuously gather module installation status and relays the information to the DES to check for correct or incorrect installation via module identification protocols. Each module contains module information to ensure components are assembled correctly, e.g. the assembled UAS compares favorably to the planned configuration. If the module information received by the system does not compare favorably to that required for task completion, the operator is given an error that requires correction for UAS operation and further instructions.

Modules are assembled via a locking system that provides both a physical and data connection to aid in correct UAS assembly although alternate connections provided by a manufacturer may also be utilized. If communication is not available, the archaeologist may select a component on the image display to mark the module as installed, such as a tap on a mobile device screen. In some embodiments, more than one UAV is required and assembled for the task and may be used in tandem (e.g. swarming or flocking). In other cases, more than one operator or one user device may be necessary.

When assembly is correctly completed by the operator, aided by the DES and error checked, the UAS is prepared for flight. During preflight, the DES performs the calibration of all components to aid in successful task completion. For example, the DES calculates if the range of the UAV is sufficient to acquire the remote sensing data and successfully return home based on the power consumption, environmental conditions, and aircraft weight. The DES calibrates the aircraft for flight including stabilization, power, payload, and so forth. Furthermore, the DES ensures all UAS components are ready for flight.

As the archaeologist lacks experience with a UAS, ARES implements additional safety precautions including obstacle avoidance, expanded geofencing to ensure an aircraft does not enter restricted airspace or fly too high, and a kill switch to disable the aircraft. The ARES gives an instrument rated UAS operator wider operating parameters, for example, a smaller geofence or allows the aircraft to fly closer to obstacles.

During operation (e.g. task execution), the operator interfaces with the aircraft and overall UAS through a controller, and ARES is responsible for collecting the state of the UAS and the environment. The real-time data is processed by the DES and can include environment data such as wind-speed, obstacle avoidance, and weather conditions. The DES also processes data relating to in-flight safety, UAS location relative to target data set, task progress, waypoint navigation, UAS stabilization, continuous error checking for component failure, loss of ground control communication, UAS onboard component communication status, onboard data processing (e.g. storing collected data with associated telemetry, compression, streaming collected data to ground control or internet), and streaming collected images to the ARES which can allow the user to adjust task parameters based on new information or cancel the task.

During operation, the DES may be monitoring several UAS aspects such as current position, altitude, and range to ensure the task can still be safely completed and the aircraft can be safely recovered. When the UAS approaches failure in any of these areas, such as the current position nearing the limits of the current UAS range based on the current fuel or battery charge level, it notifies ARES to initiate safety procedures. ARES warns the user of the potential failure and, depending on the user skill level, ARES may take control of the UAS to ensure it is returned successfully. ARES responds in situations of user indecision when an immediate action is necessary. More experienced users may have the option to operate the UAS until complete failure while only receiving warnings about the state of the UAS as it approaches failure. The UAS, ARES, and the DES operate until task completion. This completion may include that the task is successfully completed, the task is aborted based upon external factors such as component failure or safety concerns, or the task is cancelled by the user and the aircraft is safely on the ground.

It should be noted that the operator may also utilize a UAS that is only ARES compatible and not fully ARES enabled. This may include a UAS supplied by any third party manufacturers. As opposed to an ARES enabled system, one that is marked compatible may not be able to interface with UAS modules as easily because they lack the correct communication protocols (e.g. perhaps the UAS is not equipped with wireless for the modules to directly communicate with the user device). The archaeologist employs modifications to utilize ARES with the third party system. As an illustrative example, the operator uses computer vision, RFID, image tags, or other means of identifying the component parts as the modules may not be able to communicate directly to ARES.

The above mentioned UAS parts are identifiable because their specifications are in the module database. These specifications may be provided as part of the ARES, by a third-party manufacturer, from the Internet or Cloud, or added from another source (e.g. user input, crowdsourcing). If a component is not in the module database, the operator has the option of adding parameters into the database. With the module data from ARES, the DES can provide assembly and configuration instructions to the user based on their skill level. After assembly, the ARES sends the updated module data to the DES that can provide an airworthiness and safety evaluation for operation and task completion. During flight, a system that is only ARES compatible will not be able to stream on-board data to a user device. This may include full real-time telemetry from the on-board modules to evaluate current weather conditions and task completion status and may require more onboard aircraft processing. An ARES compatible UAS may also load the control software onto the aircraft itself. An ARES compatible UAS receives many benefits including simplified task planning and configuration.

This above example concerns one user, one UAS, and one user device. There may be permutations of this including one user operating multiple UAS designed for separate tasks; multiple users and a single UAS; multiple users and multiple UAS; and multiple user devices, perhaps for processing power or differing tasks.

The invention claimed is:
1. An unmanned aircraft system (UAS), comprising:
an unmanned aerial vehicle (UAV);
a processor executing code to provide an automated readiness evaluation system (ARES); and
a user input device receiving user input indicating a selected task for the UAS;
wherein the ARES selects a set of UAS configurable hardware modules for the UAV from a plurality of potential hardware modules based on the selected task for the UAS,
wherein the set of UAS configurable hardware modules are physically and communicatively coupled to the UAV prior to performance of the selected task based on assembly instructions output by the ARES, and
wherein the ARES configures at least one of the UAS configurable hardware modules for performance of the selected task for the UAS.

2. The UAS of claim 1, wherein the user input device is further operated to receive user input indicating a skill level of an operator of the UAS and wherein the selected task for the UAS is chosen from a subset of all available tasks performable by the UAS that is selected by the ARES based on the skill level of the operator.

3. The UAS of claim 1, wherein the user input device is further operated to receive user input indicating a skill level of an operator of the UAS and wherein the ARES configures or calibrates at least one of the UAS configurable hardware modules based on the skill level of the operator.

4. The UAS of claim 1, further including a module data repository storing module data for each of the set of UAS configurable hardware modules including an identifier and a location and wherein the ARES selects or configures one or more of the set of UAS configurable hardware modules based on the module data.

5. The UAS of claim 4, wherein the module data further includes one or more of: module weight, power consumption, sensors provided with a module, lift provided, power provided, and source.

6. The UAS of claim 1, wherein the set of UAS configurable hardware modules includes at least one of a camera, a sensor, a navigation element, a processor, a communication device, memory, data storage, a power source, a fuselage, a stabilization mechanism, a payload, a thrust mechanism, a flight control device, an environmental sensor, safety hardware, ground control, an identifying image tag, and an identifying RFID tag.

7. An unmanned aircraft system (UAS), comprising:
a processor executing code to provide an automated readiness evaluation system (ARES); and
a user input device receiving user input indicating a selected task for the UAS;
wherein the ARES selects, from a plurality of potential components for a UAV, a set of components for assembling into the UAV based on the selected task for the UAS, and wherein the ARES communicates the selected set of components along with an identifier for each of the components to the user input device for display.

8. The UAS of claim 7, wherein, after the set of components are assembled into the UAV, the ARES configures or defines configuration for at least one of the components for performance of the selected task for the UAS.

9. The UAS of claim 7, wherein the user input device is further operated to receive user input indicating a skill level of an operator of the UAS, wherein the selected task for the UAS is selected from a subset of all available tasks selected by the ARES based on the skill level of the operator, and wherein the subset of all available tasks is displayed on the user input device.

10. The UAS of claim 7, wherein the user input device is further operated to receive user input indicating a skill level of an operator of the UAS and wherein the ARES configures or defines configuration for at least one of the components based on the skill level of the operator.

11. The UAS of claim 7, further including a module data repository storing module data for each of the set of components including an identifier and a location and wherein the ARES selects or configures one or more of the set of UAS configurable hardware modules based on the module data.

12. The UAS of claim 11, wherein the module data further includes one or more of: module weight, power consumption, sensors provided with a module, lift provided, power provided, and source.

13. The UAS of claim 7, wherein the set of components includes at least one of a camera, a sensor, a navigation element, a processor, a communication device, memory, data storage, a power source, a fuselage, a stabilization mechanism, a payload, a thrust mechanism, a flight control device, an environmental sensor, safety hardware, ground control, an identifying image tag, and an identifying RFID tag.

14. A method of operating a UAS, comprising:
with an input device, receiving first user input selecting a task for the UAS and second user input providing a skill level of an operator of the UAS;
with a processor, determining, based on the skill level of the operator of the UAS, a set of hardware modules for performing the task; and
displaying on a display device the set of hardware modules.

15. The method of claim 14, further comprising receiving module data for each of the hardware modules and determining whether all the hardware modules are present in an assembly of the hardware modules.

16. The method of claim 14, further comprising determining whether an assembly of the set of hardware modules is airworthy or is safely operable.

17. The method of claim 14, further comprising calibrating one or more of the hardware modules for performance of the task for the UAS.

18. The method of claim 14, further comprising configuring one or more of the hardware modules based on the task.

19. The method of claim 14, further comprising receiving module data for one or more of the hardware modules via at least one of: data transfer from a communication element on the one or more of the hardware modules; scanning an RFID tag on the one or more of the hardware modules; scanning an image tag on the one or more of the hardware modules; and processing an image of the one or more of the hardware modules with computer vision.

20. The method of claim 14, further comprising:
displaying on the display device a set of assembly instructions for attaching the set of hardware modules to a UAV;
attaching each of the hardware modules to the UAV based on the set of assembly instructions; and
after the attaching, calibrating or configuring one or more of the hardware modules for performance of the task for the UAS.

* * * * *